United States Patent [19]

Kremnev et al.

[11] 3,846,571

[45] Nov. 5, 1974

[54] PROCESS OF TREATMENT OF SMOKED-AND-DRIED MEAT

[76] Inventors: Oleg Alexandrovich Kremnev, ulitsa Vladinirskaya, 51-53, kv. 12; Vladimir Rudolfovich Borovsky, ulitsa Pimoenko, 20, kv. 12; Sergei Semenovich Kravets, ulitsa Kultury, 20, kv. 14, all of Kiev; Nikolai Fedorovich Alexeev, Balshay Dorogamilovskaya, 60, kv. 32, Moscow; Vladislav Arkhipovich Tsvetkov, Volzhsky bulvar, 34, Kv. 36; Vladimir Borisovich Bogdanovsky, ulitsa Menikova, 17, kv. 43, Moscow, all of U.S.S.R.

[22] Filed: Mar. 2, 1972

[21] Appl. No.: 231,423

[52] U.S. Cl. ............................ 426/415, 426/410
[51] Int. Cl. ............................................ A23l 1/31
[58] Field of Search ...... 99/109, 208, 229; 426/370, 426/382, 410, 413, 415, 302, 404

[56] References Cited
UNITED STATES PATENTS

| | | | |
|---|---|---|---|
| 3,117,869 | 1/1964 | Sims | 99/109 |
| 3,241,982 | 3/1966 | Shank | 99/208 |
| 3,634,102 | 1/1972 | Paynter et al. | 99/208 X |

*Primary Examiner*—A. Louis Monacell
*Assistant Examiner*—R. A. Yoncoskie
*Attorney, Agent, or Firm*—Waters, Roditi, Schwartz & Nissen

[57] ABSTRACT

A process for treating smoked meat products wherein the product is enclosed in an envelope made of cardboard or like paper material and wherein the product is subsequently dried under a forced circulation of heated air at 20°C to 40°C flowing at a rate of 1 to 5 m/sec.

1 Claim, No Drawings

PROCESS OF TREATMENT OF SMOKED-AND-DRIED MEAT

The present invention relates to processes of treatment of smoked-and-dried meat products.

Known in the art is a process of treatment of smoked-and-dried meat products, comprising the steps of enclosing said products into envelopes and drying thereof for about five days with subsequent removal of said envelopes and further drying without envelopes. The drying is effected in a drying room under natural air convection at 12°–14°C and at a relative humidity of 75–78 percent.

By the above-mentioned process, due to the low temperature of air, drying is performed for 30 days and more depending on the initial moisture content, geometrical dimensions and kind of products being treated.

The intensity of the removal of moisture being evaporated from the products under the conditions of natural convection of air is very low. In order to provide for intensive moisture removal, the products being dried are spaced at a great distance from one another. A long duration of the drying process, as well as inefficient utilization of an effective volume of a drying room result in a low output per unit of the production area.

Furthermore, in drying by the above prior-art method, it is not possible, in practice, to maintain the same parameters of air in all points of a drying room, which results in molding, deformation and souring of a certain part of the products.

It is an object of our invention to provide a process, which permits the increase in an output of smoked-and-dried meat product per unit of the production area.

According to the present invention, the process for the treatment of meat products comprises the steps of enclosing the product into an envelope and subsequent drying thereof with air whereby the drying process is effected under forced of air which is being simultaneously heated.

It is advantageous that the air velocity be from 1 to 5 m/sec, and that the temperature, be from 20° to 40°C.

In the process according to the invention, due to an increase of the drying temperature, the movement of moisture from the inside of the product body towards the surface thereof is intensified, whereby the drying process is accelerated. At the same time, the use of envelopes prevents the superficial stratum of the product from being overdried.

Furthermore, due to forced circulation of air, which provides for heat supply to the products and the removal of moisture therefrom, it becomes possible to accelerate the removal of moisture from the products, more completely utilize the effective volume of the drying room and to reduce the percentage of rejects.

The duration of the drying process by the method according to the invention is reduced to 6–8 days.

The reduction of duration and the consequent improvement of the quality of drying, as well as more efficient utilization of the effective volume of the drying room, make it possible to increase the output of smoked-and-dried meat products per unit of the production area by 5 times and more.

The invention will be better understood from the following detailed description of the process according to the invention.

The process according to the invention consists in the following.

After smoking, the product is enclosed in an envelope comprising a sleeve provided with a cover and made of a cardboard or a like paper material.

This envelope decelerates the evaporation of moisture from the surface of the product, thereby preventing it from being overdried. Overdried superficial layer of the meat product exhibits considerable moisture resistance and hampers the moisture escape from the internal layers. The danger of overdrying is especially great at the beginning of the drying, when a considerable moisture content gradient occurs in the superficial layer, whereas in the internal layers the moisture is uniformly distributed.

The sleeves containing the products are charged into the drying room and are dried in a flow of air supplied by a fan unit, the air velocity varying within the range of 1 to 5 m/sec.

Before entrance into the drying room there is mounted an air heater which is adapted to heat the air up to a desired temperature of from 20° to 40°C, depending on the kind of product being treated and the initial moisture content thereof.

The use of envelopes made of paper material eliminates the need for special humidification of the air and control of the relative humidity thereof. During the first 2–3 days of drying, due to artificial deceleration of the evaporation of moisture from the surface of the product caused by the envelope and elevated temperature of the air, redistribution of the moisture content over the cross section of the product occurs: the moisture content gradient is reduced in the superficial layer and is increased in the internal layers.

It is the attainment of a predetermined gradient of moisture content over the volume of product that ensures an intensive moisture supply to the surface from the internal layers thereof, whereby more rapid and uniform drying is obtained for 6–8 days.

The performance of the drying process at an elevated temperature, which is only 2°–3°C lower than the melting point of lard, does not result in any considerable growth of microorganisms, since rapid dehydration of the product takes place.

A comparative table of characteristics of drying the "Stolichnaya" sausage obtained by the prior-art process and by the process according to the invention is given hereinbelow.

| Characteristic No. of the process | | Unit | Drying by prior-art process | Drying by the process according to the invention |
|---|---|---|---|---|
| 1 | Time of drying | Days | 30 | 6 |
| 2 | Total initial moisture content | % | 21.8 | 45 |
| 3 | Total final moisture content: | | | |
| | a) in the superficial stratum | % | 21.8 | 26.6 |
| | | % | 16.4 | 18 |
| | b) in an intermediate stratum | % | 27.0 | 29.0 |
| | c) at the center of a stick | % | 30.1 | 30.3 |

Note: During the drying by the process according to the invention envelopes made of 2 mm cardboard were used.

What is claimed is:

1. A method for drying a smoked meat product while avoiding over-drying of the surface of said product comprising the steps of enclosing said product in an envelope of a paper material and exposing the enclosed product to a current of air having a temperature of 20°C. to 40°C. and flowing at a rate of 1 to 5 m/sec, whereby the product is dried in about 6–8 days.

* * * * *